United States Patent
Lim

(10) Patent No.: US 9,076,102 B2
(45) Date of Patent: Jul. 7, 2015

(54) IMAGE FORMING APPARATUS, HOST APPARATUS, IMAGE FORMING SYSTEM HAVING THE SAME, AND METHOD OF CONTROLLING POWER THEREOF

(71) Applicant: Mok-hwa Lim, Suwon-si (KR)

(72) Inventor: Mok-hwa Lim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 33 days.

(21) Appl. No.: 13/737,976

(22) Filed: Jan. 10, 2013

(65) Prior Publication Data

US 2013/0182272 A1    Jul. 18, 2013

(30) Foreign Application Priority Data

Jan. 12, 2012   (KR) .......................... 10-2012-0003953

(51) Int. Cl.
| | |
|---|---|
| G06F 15/00 | (2006.01) |
| G06F 3/12 | (2006.01) |
| G06K 1/00 | (2006.01) |
| G06K 15/00 | (2006.01) |
| H04N 1/00 | (2006.01) |

(52) U.S. Cl.
CPC ........ *G06K 15/4055* (2013.01); *H04N 1/00888* (2013.01); *H04N 1/00896* (2013.01)

(58) Field of Classification Search
CPC .......... G06K 15/4055; H04N 1/00888; H04N 1/00896
USPC ................................ 358/1.1, 1.13, 1.14, 1.15
See application file for complete search history.

(56) References Cited

U.S. PATENT DOCUMENTS

| | | |
|---|---|---|
| 5,923,919 A | 7/1999 | Nimura et al. |
| 6,977,739 B2 | 12/2005 | Higuchi et al. |
| 2004/0021891 A1 | 2/2004 | Higuchi et al. |
| 2009/0150698 A1 | 6/2009 | Lee |

FOREIGN PATENT DOCUMENTS

| | | |
|---|---|---|
| JP | 08-025757 | 1/1996 |
| JP | 08-115188 | 5/1996 |
| JP | 10-058792 | 3/1998 |
| JP | 10-293506 | 11/1998 |

(Continued)

OTHER PUBLICATIONS

English translation of KP20070033192A. Original Korean document entered as prior art by Applicant on Aug. 16, 2013.*
English translation of JP10293506A. Original Japanese document entered as prior art by Applicant on Aug. 16, 2013.*

(Continued)

*Primary Examiner* — Douglas Tran
(74) *Attorney, Agent, or Firm* — Staas & Halsey LLP

(57) ABSTRACT

An image forming system includes an image forming apparatus and a host apparatus. The image forming apparatus counts an idle state time during which the image forming apparatus is not in use, and, when the idle state time reaches a predetermined threshold time, transmits a notice screen display command to the host apparatus. The host apparatus displays a notice screen, and, when a turn on time extension menu is selected on the notice screen, transmits a turn on time extension command to the image forming apparatus. When the turn on time extension command is received, the image forming apparatus resets a timer unit and recounts the idle state time, and, when the turn on time extension command is not received for a predetermined time, is automatically turned off.

8 Claims, 6 Drawing Sheets

(56) References Cited

FOREIGN PATENT DOCUMENTS

| | | |
|---|---|---|
| JP | 2000-172474 | 6/2000 |
| JP | 2000-276322 | 10/2000 |
| JP | 2009-271413 | 11/2009 |
| KR | 1020050060757 | 6/2005 |
| KR | 1020070033192 | 3/2007 |

OTHER PUBLICATIONS

International Search Report dated May 31, 2013 issued in International Application No. PCT/KR2013/000012.
International Written Opinion dated May 31, 2013 issued in International Application No. PCT/KR2013/000012.
Extended European Search Report mailed May 20, 2015 for corresponding European Patent Application No. 13275004.3.

* cited by examiner

IMAGE FORMING APPARATUS, HOST APPARATUS, IMAGE FORMING SYSTEM HAVING THE SAME, AND METHOD OF CONTROLLING POWER THEREOF

CROSS-REFERENCE TO RELATED APPLICATIONS

This application claims priority under 35 U.S.C. §119 from Korean Patent Application No. 10-2012-0003953, filed on Jan. 12, 2012, in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to an image forming apparatus, a host apparatus, an image forming system including the same, and a method of controlling power thereof, and more particularly, to an image forming apparatus and a host apparatus which provide an auto power shut off function, an image forming system including the same, and a method of controlling power thereof.

2. Description of the Related Art

Image forming apparatuses, such as printers and scanners, are being widely used in an office environment, such as companies or public offices and at home.

Such an image forming apparatus is generally connected to a host apparatus and stays turned on even in a standby state. Therefore, there is a problem that unnecessary power is wasted. In order to solve this problem, various methods have been suggested.

One of the methods is changing a mode to a power saving mode automatically when an image forming apparatus is not in use for a predetermined time. However, as environmental regulations have been tightened, an auto power shut off function, which automatically turns off an image forming apparatus if a user does not use the image forming apparatus for a predetermined time, has been suggested in addition to the power saving function.

In particular, an industrial standard, for example, ErP Lot 6 power management standard, requires that a product should be equipped with such an auto power shut off function.

However, if the auto power shut off function is applied and thus an image forming apparatus is turned off before a user is aware, the user should turn on the image forming apparatus again and should wait until initialization is completed in order to use the image forming apparatus. This may cause inconvenience to the user.

In particular, if an image forming apparatus is automatically turned off while a job to be done is being prepared, the job cannot be processed at a time when the job is scheduled to be performed since the image forming apparatus is turned off at that time, and can be performed afterward only if the user turns on the image forming apparatus again.

Also, if an image forming apparatus is automatically turned off when an error occurs in the process of performing a printing job and thus the printing job does not progress any more, the printing job which is being stored in a volatile memory may be lost and the user cannot restore the printing job.

SUMMARY OF THE INVENTION

One or more exemplary embodiments provide an image forming apparatus and a host apparatus which can extend a turn on time according to user selection prior to performing an auto power shut off function, an image forming system including the same, and a method of controlling power thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming system including an image forming apparatus to perform an image forming job, and a host apparatus connected to the image forming apparatus. The image forming apparatus may count an idle state time during which the image forming apparatus is not in use, and, when the idle state time reaches a predetermined threshold time, the image forming apparatus may transmit a notice screen display command to the host apparatus. When the notice screen display command is received, the host apparatus may display a notice screen, and, when a turn on time extension menu is selected on the notice screen, the host apparatus may transmit a turn on time extension command to the image forming apparatus. When the turn on time extension command is received, the image forming apparatus may reset a timer unit and recount the idle state time, and, when the turn on time extension command is not received for a predetermined time, the image forming apparatus may be automatically turned off.

When an idle state time counted in a general mode of the image forming apparatus reaches a predetermined first threshold time, the image forming apparatus may change the mode to a power saving mode, and, when an idle state time counted from when the mode is changed to the power saving mode reaches a predetermined second threshold time, the image forming apparatus may transmit the notice screen display command to the host apparatus.

The foregoing and/or other features and utilities of the present general inventive concept may also be achieved by providing an image forming apparatus including an image forming unit to perform an image forming job, a power supply unit to supply power to the image forming unit, a timer unit to count an idle state time of the image forming unit, and a controller to provide a notice screen to receive selection as to whether to extend a turn on time when the idle state time reaches a predetermined threshold time, and to control the power supply unit to shut off power automatically or extend the turn on time according to user selection made on the notice screen.

The image forming apparatus may further include an interface unit which is connected to a host apparatus. In this case, when the idle state time reaches the threshold time, the controller may transmit a notice screen display command to the host apparatus so that the notice screen is displayed through the host apparatus, and, when a turn on time extension menu is selected on the notice screen, the controller may control the power supply unit to extend the turn on time.

When an auto power shut off menu is selected on the notice screen displayed on the host apparatus or if user selection is not made for a predetermined time, the controller may control the power supply unit to shut off the power automatically.

When the idle state time reaches the threshold time, the controller may check whether there is a job to be done in a job queue or there is an uncompleted job, and when there is such a job, the controller may reset the timer unit.

When a timer reset event occurs, the controller may reset the timer unit to reset the idle state time.

The image forming apparatus may further include a user interface unit.

In this case, when the idle state time reaches the threshold time, the controller may provide the notice screen through the user interface unit, and, when a turn on time extension menu is selected on the notice screen, the controller may extend the turn on time, and, when an auto power shut off menu is selected on the notice screen or user selection is not made for a predetermined time, the controller may control the power supply unit to shut off the power automatically.

When an idle state time counted in a general mode of the image forming unit reaches a predetermined first threshold time, the controller may change the mode to a power saving mode, and, when an idle state time counted from when the mode is changed to the power saving mode reaches a predetermined second threshold time, the controller may provide the notice screen and may control the power supply unit to shut off the power automatically or extend the turn on time according to user selection made on the notice screen.

The foregoing and/or other features and utilities of the present general inventive concept may also be achieved by providing a method of controlling power of an image forming apparatus, the method including counting an idle state time of the image forming apparatus when the image forming apparatus is in a general mode, changing the mode to a power saving mode when the idle state time reaches a predetermined first threshold time, recounting an idle state time of the image forming apparatus from when the mode is changed to the power saving mode, providing a notice screen when the recounted idle state time reaches a predetermined second threshold time, and extending a turn on time when a turn on time extension menu is selected on the notice screen, and automatically shutting off power of the image forming apparatus when an auto power shut off menu is selected on the notice screen or if user selection is not made for a predetermined time.

The providing the notice screen may include, when the recounted idle state time reaches the second threshold time, transmitting a command to display the notice screen to a host apparatus and displaying the notice screen through the host apparatus.

The method may further include, when there is a job in a job queue or there is an uncompleted job when the recounted idle state time reaches the second threshold time, resetting the idle state time.

The method may further include, when a timer reset event occurs, resetting the idle state time.

The providing the notice screen may include, when the recounted idle state time reaches the second threshold time, displaying the notice screen on a display panel of the image forming apparatus.

The foregoing and/or other features and utilities of the present general inventive concept may also be achieved by providing a host apparatus including an interface unit to receive a notice screen display command from an image forming apparatus, a display unit to display a notice screen including a turn on time extension menu when the notice screen display command is received, and a controller to transmit a turn on time extension command to extend a turn on time of the image forming apparatus through the interface unit when the turn on time extension menu is selected on the notice screen.

The auto power shut off function may be selectively executed according to a user selection.

The foregoing and/or other features and utilities of the present general inventive concept may also be achieved by providing a method of controlling power of an image forming apparatus, the method including performing an image forming job in an image forming unit, supplying power to the image forming unit according to a power turn on time, and generating a signal corresponding to a notice screen to indicate that power is automatically shut off and to indicate a selection of extension of the power turn on time.

The foregoing and/or other features and utilities of the present general inventive concept may also be achieved by providing a computer-readable medium to contain computer-readable codes as a program to execute a method of controlling power of an image forming apparatus, the method including performing an image forming job in an image forming unit, supplying power to the image forming unit according to a power turn on time, and generating a signal corresponding to a notice screen to indicate that power is automatically shut off and to indicate a selection of extension of the power turn on time.

The generating of the signal may include determining a predetermined time before an automatic power turn off time; and generating the signal according to the determination.

The power turn on time is in a power saving mode.

The method may further include controlling the power supply to turn off the power according to a first turn on time, extending the first turn on time to a second turn on time before the first turn on time expires according to the selection, and controlling the power supply unit to maintain the supply of power according to the second turn on time.

The controlling may include counting an idle state time of the image forming apparatus when the image forming apparatus is in a general mode, when the idle state time reaches a predetermined first threshold time, changing the mode to a power saving mode, counting an idle state time of the image forming apparatus from when the mode is changed to the power saving mode, when the recounted idle state time reaches a predetermined second threshold time, providing a notice screen, and when a turn on time extension menu is selected on the notice screen, extending the first turn on time to the second turn on time, and, when an auto power shut off menu is selected on the notice screen or when user selection is not made for a predetermined time, automatically shutting off power of the image forming apparatus.

The foregoing and/or other features and utilities of the present general inventive concept may also be achieved by providing an image forming apparatus including an image forming unit to perform an image forming job, a power supply unit to supply power to the image forming unit according to a power turn on time, and a controller to generate a signal corresponding to a notice screen to indicate that power is automatically shut off and to indicate a selection of extension of the power turn on time.

The controller may determine a predetermined time before an automatic power turn off time, and generates the signal according to the determination.

The power turn on time is in a power saving mode.

The controller may receive the selection of the extension of the power turn off time, and control the power supply unit to extend the supply of power according to the selection of the extension of the power turn off time.

The controller may control the power supply to turn off the power according to a first turn on time, extend the first turn on time to a second turn on time before the first turn on time expires according to a user command, and control the power supply unit to maintain the supply of power according to the second turn on time.

The first turn time may be a period to maintain the supply of power, and the controller may control the power supply unit to shut off the power when no user command is input to extend the first turn on time to the second turn on time and when the first turn on time expires.

The first turn on time and the second turn on time may overlap. The first turn time and the second turn on time may not overlap.

The power supply unit may control the supply of power to the image forming unit according to a normal mode and a power saving mode, the first turn on time may be a period to maintain the power saving mode such that the controller controls the power supply unit to shut off the power after the first turn on time expires without the extension, and the second turn on time may be a period to restart the power saving mode and to maintain a second power saving mode.

The controller may generate a signal corresponding to a notice screen before the first turn on time expires, receives the user command in response to the notice screen, and extend the first turn on time to the second turn on time according to the received user command.

The image forming apparatus may further include a display unit to display menus corresponding to the image forming unit and to display a notice screen such that a user inputs a user command to extend the first turn time to the second turn on time according to the displayed notice screen.

The controller may generate a notice screen including a notice message display area corresponding to the first turn on time, and a first menu associated with the notice message display area to input the user command.

The foregoing and/or other features and utilities of the present general inventive concept may also be achieved by providing a host apparatus including an interface connectable to an external image forming apparatus to receive a signal from the external image forming apparatus, and a controller to generate a notice screen according to the received signal and to control the interface to transmit a user command in response to the received signal such that a first turn on time of the image forming apparatus is extended to a second turn on time.

The host apparatus may further include a display unit to display the notice screen such that the user command is input according to the displayed screen.

The controller may generate the notice screen including a notice message display area corresponding to the first turn on time, and a first menu to input the user command according to the notice message display area.

The foregoing and/or other features and utilities of the present general inventive concept may also be achieved by providing an image forming system having an image forming apparatus including an image forming unit to perform an image forming job, a power supply unit to supply power to the image forming unit according to a power turn on time, and a controller to generate a signal corresponding to a notice screen to indicate that power is automatically shut off and to indicate a selection of extension of the power turn on time, and a host apparatus to receive the signal from the first controller, to generate a notice screen according to the received signal, and to transmit the selection of extension in response to the notice screen such that the controller of the image forming apparatus extends the power turn on time to a second turn on time according to the received selection.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
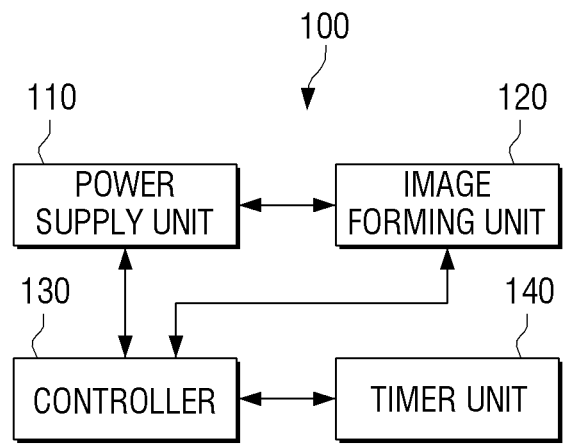
FIG. 1 is a block diagram illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating an image forming apparatus 100 according to an exemplary embodiment of the present general inventive concept. The image forming apparatus 100 may be a printer, a scanner, a copier, or a multifunction peripheral (MFP). However, the present general inventive concept is not limited thereto. The image forming apparatus 100 may be an electrical apparatus having an image forming unit to generate an image and/or to form an image on a medium, and the image forming unit is controlled to be in a power saving mode and a power shut off mode such that power consumed by the image forming unit can be reduced or shut off. Referring to FIG. 1, the image forming apparatus 100 may include a power supply unit 110, an image forming unit 120, a controller 130, and a timer unit 140.

The image forming unit 120 performs an image forming job. The image forming unit 120 may have electrical and mechanical components to form an image on a medium or to print an image on a print medium. The image forming unit 120 may have a different configuration according to a type of the image forming apparatus 100. For example, when the image forming apparatus 100 is a laser type image forming apparatus, the image forming unit 120 may include a photoconductor, a laser scanning unit (LSU), a charging unit, a developing unit, a transfer unit, and a fusing unit. The image forming unit 120 is driven by power supplied from the power supply unit 110.

The power supply unit 110 supplies power to elements of the image forming apparatus 100 including the image forming unit 120. The power supply unit 110 may be connected to an external power source and may convert a first voltage input from the external power source to a second voltage corresponding to the image forming unit 120 and provide the converted voltage to the elements thereof.

When a command is input to turn on at least one element of the image forming apparatus 100, the controller 130 controls the power supply unit 110 to supply power to the corresponding element, for example, the image forming unit 120. When a command is input to turn off at least one element of the image forming apparatus 100, the controller 130 controls the power supply unit 110 to shut off the power supplied to the corresponding element, for example, the image forming unit 120.

The controller 130 may control the power supply unit 110 to generate one or more different voltages to be supplied to the image forming unit 120 according to one or more modes set in the image forming apparatus 100. The controller 130 may control the power supply unit 110 to generate one or more voltages to be supplied to one or more elements of the image forming apparatus 100 according to one or more modes set in the image forming apparatus. The controller 130 may also control the power supply unit 110 to selectively shut off the power supplied to one or more elements of the image forming apparatus 100. The controller 130 may also control the power supply unit 110 to shut off the power such that the image forming apparatus 100 is turned off according to a mode set in the image forming apparatus 100 or according to a user manipulation of a button formed on the image forming apparatus 100. The controller 130 may control the power supply unit 110 to start supply of the power to the corresponding element to turn on the image forming apparatus 100 according to a mode of the image forming apparatus 100 or according to a user manipulation of a button formed on the image forming apparatus 100.

The controller 130 controls the timer unit 140 to count an idle state time when the image forming unit 120 is not in use during a turn-on state of the image forming apparatus 100. When a timer reset event occurs, the controller 130 controls the timer unit 140 to reset the counted time and to recount a new time. The timer reset event may occur when various keys on the image forming apparatus 100 or a touch pad is manipulated by a user, when a state of the image forming apparatus 100 is checked or changed through a remote user interface (UI), when various covers of the image forming apparatus 100 is opened to perform a maintenance operation on the elements thereof or to replace one element with a new one, when a driver program is executed by the user in a host apparatus, when a packet is transmitted and/or received through a specific IP and a port between a host apparatus and the image forming apparatus 100, when a communication, for example, an Ethernet link, is established, when a job command is received from a host apparatus, and when one or more other external apparatuses access to the image forming apparatus 100.

When it is determined that the idle state time reaches a predetermined threshold time or a reference time, the controller 130 checks whether there is a job to be done in a job queue or whether there is an uncompleted job. If so, the controller 130 resets the timer unit 140 and controls the timer unit 140 to recount a new time upon the completion of the pending or uncompleted job.

The timer unit 140 provides information on the counted time to the controller 130.

When the idle state time counted by the timer unit 140 reaches a predetermined threshold time or a reference time, the controller 130 provides a notice screen to receive a user selection as to whether to extend a turn on time. The controller 130 may automatically shut off the power of the image forming apparatus 100 or may extend a turn on state according to the user selection made on the notice screen.

The controller 130 may compare the counted time with a reference time to determine that the counted time is the same as or greater than the reference time and then generate a signal corresponding to the notice screen.

The notice screen may be provided in various ways according to an exemplary embodiment. This will be explained below in detail. For example, the notice screen may be provided through a host apparatus connected to the image forming apparatus 100. The notice screen may be provided through a display panel provided on the image forming apparatus 100. Also, the notice screen may be provided through a mobile device of a user, which is registered at the image forming apparatus 100.

When the host apparatus receives the signal from the image forming apparatus 100, the host apparatus generate the notice screen stored in a memory unit of the host apparatus to display the notice screen of a display unit (or a display panel) of the host apparatus. Then the display unit is disposed outside of the host apparatus and connected to the host through a wired or wireless communication, the host apparatus may generate a signal corresponding to the notice screen such that the display unit can display the notice screen and also receive a user selection of whether to extend the turn on time and/or how much time to be extended.

When the image forming apparatus 100 is formed with the display unit (or display panel), the controller 130 controls the display unit to display the notice screen to receive a user selection of whether to extend the turn on time and/or how much time to be extended.

It is possible that the notice screen is displayed on the display unit of both the host apparatus and the image forming apparatus 100 and that the user selection can be input from either the host apparatus or the image forming apparatus 100. The controller 130 is configured to generate a signal to either the host apparatus or the display unit of the image forming apparatus 100 such that the notice screen is displayed thereon.

However, it is possible to set the host apparatus as a primary apparatus with a priority to receive and display the notice screen from the image forming apparatus 100. It is also possible to set the image forming apparatus 100 as a primary apparatus with a priority to display the notice screen. The controller 130 is configured to provide a screen such that a user can set the primary apparatus to display the notice screen.

Figure 2:
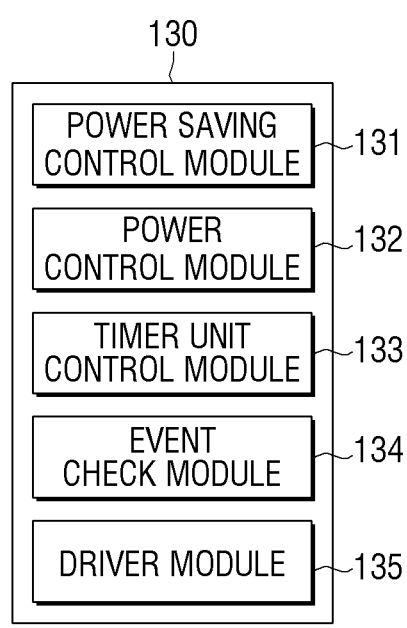
FIG. 2 is a block diagram illustrating an example of a controller of the image forming apparatus of FIG. 1.

FIG. 2 is a view illustrating an example of the controller 130 of the image forming apparatus 100 of FIG. 1. Referring to FIGS. 1 and 2, the controller 130 includes a power saving control module 131, a power control module 132, a timer unit control module 133, an even check module 134, and a driver module 135.

The power saving control module 131 performs a power saving mode change operation. The power saving control module 131 may change an operation mode of the image forming apparatus 100 to a power saving mode when the image forming apparatus 100 is not in use for a predetermined first threshold time in a general mode, and controls the elements of the image forming apparatus 100 to perform a power saving operation. According to an exemplary embodiment, the power saving mode may be performed in a plurality of phases. That is, the first threshold time is divided into a plurality of unit threshold times and the power saving mode is performed more strictly in phases every time that the idle state time reaches each unit threshold time.

The power saving mode may have one or more sub-power saving modes according to the phases such that power consumption levels of the corresponding elements can be changed or the sub-power saving modes can be selectively applied to corresponding elements. The controller 130 may control the power supply unit 110 to perform the sub-power saving modes.

The driver module 135 communicates with the host apparatus. The driver module 135 transmits a command to the host apparatus to display the notice screen at a time when a second threshold time elapses after the mode is changed to the power saving mode. That is, the threshold time described in FIG. 1 may be a sum of the first threshold time and the second threshold time. When the first threshold time is set to 10 minutes and the second threshold time is set to 120 minutes, the notice screen is displayed when the total threshold time of 130 minutes elapses. When a user selection, for example, a turn on time extension menu, is not selected for a predetermined time period, for example, 10 minutes, after the notice screen is displayed or the second threshold time lapses, the power is automatically shut off. As a result, when the image forming apparatus 100 is not in use without any selection of the user for 140 minutes, the power is automatically shut off. The first threshold time and the second threshold time may be set by the user or may be set as default. For example, the power may be set to be automatically shut off at a time when 120 minutes elapse and the notice screen may be set to be displayed 5 minutes before the power is shut off. In this case, the threshold time is 115 minutes.

The power control module 132 performs power supply and power shut off of the image forming apparatus 100. When the second threshold time elapses after the mode of the image forming apparatus 100 is changed to the power saving mode and then a separate turn on time extension command is not input or a timer reset event does occur for a predetermined time (for example, 5 minutes), the power control module 132 controls the power supply unit 110 to automatically shut off the power of the image forming apparatus 100.

The timer unit control module 133 controls an operation of the timer unit 140. The timer unit control module 133 controls the timer unit 140 to start counting a time or to reset a counted time and recount a new time.

The event check module 134 checks whether the idle state time counted by the timer unit 140 reaches the predetermined first threshold time or the second threshold time, and also, checks whether a power saving mode entrance event, a power saving mode escape event, an auto power shut off event, or a timer unit reset event occurs, and provides a result of the checking to the modules 131, 132, 133, and 135.

If the power saving mode escape event occurs, the power saving control module 131 changes the power saving mode to the general mode, and the timer unit control module 133 resets the counted idle state time and starts recounting a new time.

The modules of FIG. 2 may be realized by a program to be readable by the control unit 130 of the image forming apparatus 100. The modules may be stored in a storage unit (not illustrated) of the image forming apparatus 100 and are executed when the image forming apparatus 100 is initialized and perform the above-described functions in the controller 130.

Figure 3:
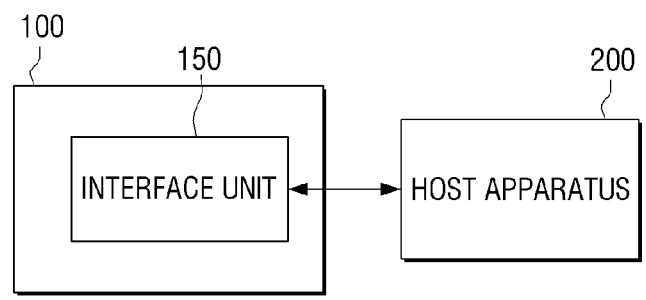
FIG. 3 is a block diagram illustrating an image forming system according to an exemplary embodiment of the present general inventive concept.

FIG. 3 is a block diagram illustrating an image forming system according to an exemplary embodiment of the present general inventive concept. Referring to FIG. 3, the image forming system includes an image forming apparatus 100 and a host apparatus 200. The image forming apparatus 100 may further include an interface unit 150 in addition to the units illustrated in FIG. 1. The interface unit 150 may be realized by a serial interface, such as an USB interface or an I2C interface. Although the image forming apparatus 100 is directly connected to the host apparatus 200 in FIG. 3, the image forming apparatus 100 may be connected to the host apparatus 200 through a wired or wireless network. In this case, the interface unit 140 may include a network interface card.

The image forming apparatus 100 transmits a notice screen display command to the host apparatus 200 through the interface unit 150 when power is set to be automatically shut off.

If the notice screen display command is received, the host apparatus 200 display a notice screen. The user may select a turn on time extension menu on the notice screen. If the turn on time extension menu is selected, the host apparatus 200 transmits a turn on time extension command to the image forming apparatus 100.

When the turn on time extension command is received, the image forming apparatus 100 extends a turn on time without shutting off the power. The turn on time may be extended in various ways. For example, the image forming apparatus 100 may reset the timer unit 140 and recount the idle state time. In this case, the turn on time may be extended longer than the second threshold time. According to another exemplary embodiment, the image forming apparatus 100 may set a third threshold time and determines whether the idle state time reaches the third threshold time or not. Accordingly, when the third threshold time elapses, the notice screen is displayed again through the host apparatus 200. This process may be repeated a predetermined number of times. For example, the third threshold time may be set to 10 minutes.

The predetermined number of times and/or the first, second, and/or the third threshold times may be set in the controller 130 of the image forming apparatus 100 according to a user command input from a button or a touch panel of a display unit of the image forming apparatus 100. It is possible that the predetermined number of times and/or the first, second, and/or the third threshold times can be set by a control signal of the host apparatus 200 when the host apparatus 200 and the image forming apparatus 100 communicate with each other to set various values corresponding to operations or functions of the image forming apparatus 100.

Figure 4:
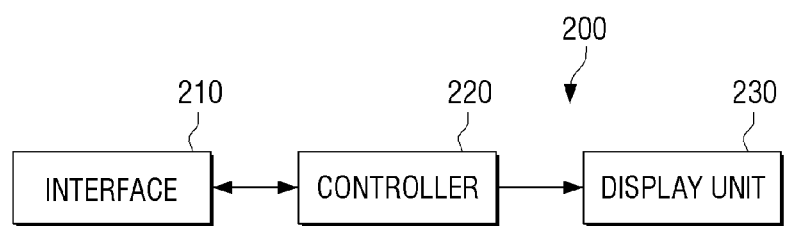
FIG. 4 is a block diagram illustrating a host apparatus according to an exemplary embodiment of the present general inventive concept.

FIG. 4 is a block diagram illustrating a host apparatus 200 according to an exemplary embodiment of the present general inventive concept. Referring to FIG. 4, the host apparatus 200 includes an interface unit 210, a controller 220, and a display unit 230.

The interface unit 210 receives a notice screen display command from the image forming apparatus 100.

The display unit 230 displays a notice screen including a turn on time extension menu when the notice screen display command is received through the interface unit 210. The display unit 230 may is connected to the controller 220 through a wired or wireless communication. It is possible that the display unit 230 is disposed on a housing of the host apparatus 200. It is also possible that the display unit 230 may be a display touch panel to display the notice screen and receive user selection or user input from the notice screen. It is also possible that display unit 230 displays the notice screen and that user selection or user input can be made through a key board button or mouse of the host apparatus 200.

The controller 220 transmits a turn on time extension command to extend a turn on time of the image forming apparatus 100 through the interface unit 210 when the turn on time extension menu is selected on the notice screen. The controller 220 may execute a driver program installed in the host apparatus 200 to connect the host apparatus 200 to the image forming apparatus 100. The host apparatus 200 may further include a storage unit (not illustrated) to store various programs and data and an input unit (not illustrated) to receive user section. The controller 220 may read the stored notice screen from the storage unit and display the read notice screen, according to the received notice screen display command.

Figure 5:
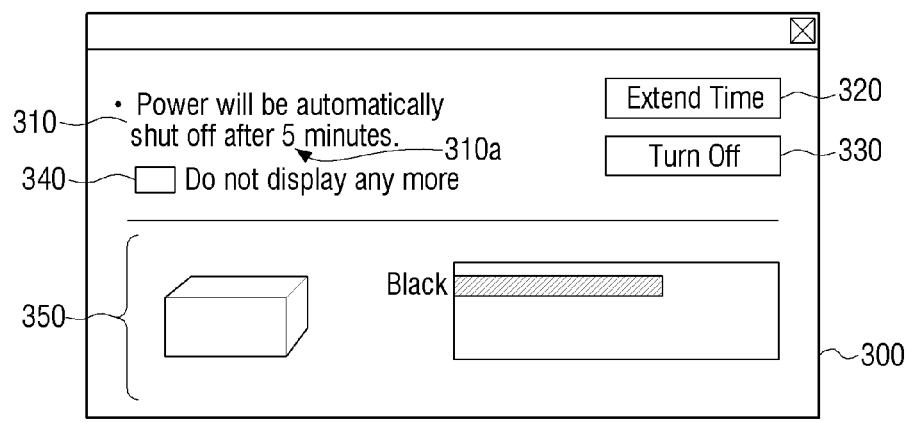
FIG. 5 is a view illustrating an example of a notice screen displayed on the host apparatus.

FIG. 5 is a view illustrating a notice screen 300 displayed by the display unit 230 of the host apparatus 200 of FIG. 4. Referring to FIGS. 4 and 5, the notice screen 300 includes a notice message display area 310, various menus 320, 330, and 340, and an information display area 350 to indicate information of the image forming apparatus 100 or information settings items or setting values of the image forming unit 120 corresponding to the image forming job.

The notice message display area 310 displays a message to inform a user that an auto power shut off function will be executed.

The first menu 320 of the menus is a menu to extend a turn on time. If the first menu 320 is selected, the controller 220 transmits a turn on time extension command to the image forming apparatus 100.

The second menu 330 is a menu to shut off power directly. When the second menu 330 is selected, the controller 220 transmits a power shut off command to the image forming apparatus 100, and controls the image forming apparatus 100 to shut off power even before a pre-set time elapses.

The third menu 340 is a menu not to display the notice screen. If the third menu 340 is selected and an auto power shut off condition is satisfied, the notice screen is not displayed until the image forming apparatus 100 or the host apparatus 200 is initialized or turned on after being turned off.

Although various messages and information and various menus are displayed on the notice screen 300 in FIG. 5, the configuration of the notice screen 300 may be changed in various ways.

The notice message display area 310 may have a section 310a corresponding to "5" among the statement of Power will be automatically shut off after 5 minutes. The section 310a of "5" may be highlighted or may be an icon with the number of "5." In this case, a user can change the number of "5" in the section 310a of the notice message display area 310. When the section 310a is selected according to a designated button or a touching operation, a user inputs a new number such that the power shut off time can be extended according to the input new number by selecting the first menu 320.

Figure 6:
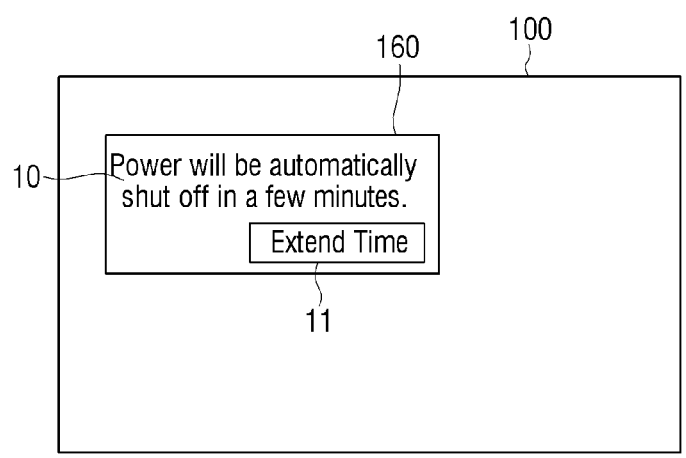
FIG. 6 is a view illustrating an example of a notice screen displayed on the image forming apparatus.

FIG. 6 is a view illustrating an image forming apparatus 100 according to an exemplary embodiment of the present general inventive concept. Referring to FIG. 6, the image forming apparatus 100 further includes a user interface unit 160. The image forming apparatus 100 of FIG. 6 may be configured as the image forming apparatus 100 of FIG. 1 and may further include the interface unit 150 of FIG. 3.

When an idle state time reaches a predetermined threshold time (or when a second threshold time elapses after a first threshold time elapses), the controller 130 may provide a notice screen 10 through the user interface unit 160. The notice screen 10 may display a turn on time extension menu 11.

When the turn on extension menu is selected on the notice screen 10, the controller 130 extends a turn on time. When a user selection is not made for a predetermined time after the notice screen 10 is displayed, the controller 130 may automatically shut off power. It is possible that the notice screen include a power shut off menu (not illustrated). When the power shut off menu is selected, the controller 130 may automatically shut off power.

According to an exemplary embodiment, the image forming apparatus 100 may register user information. Accordingly, the controller 130 may transmit a notice screen display command to a terminal apparatus corresponding to user information. The terminal apparatus may be a host apparatus, a mobile phone, a personal computer (PC), a notebook PC, a tablet PC, or a TV. The user information may be a telephone number or an IP address. The image forming apparatus 100 transmits the notice screen display command to the terminal apparatus and receives and processes the turn on time extension command according to wired or wireless communication, for example, WiFi, Bluetooth, ZigBee, IEEE, and other wired or wireless communication standards.

Figure 7:
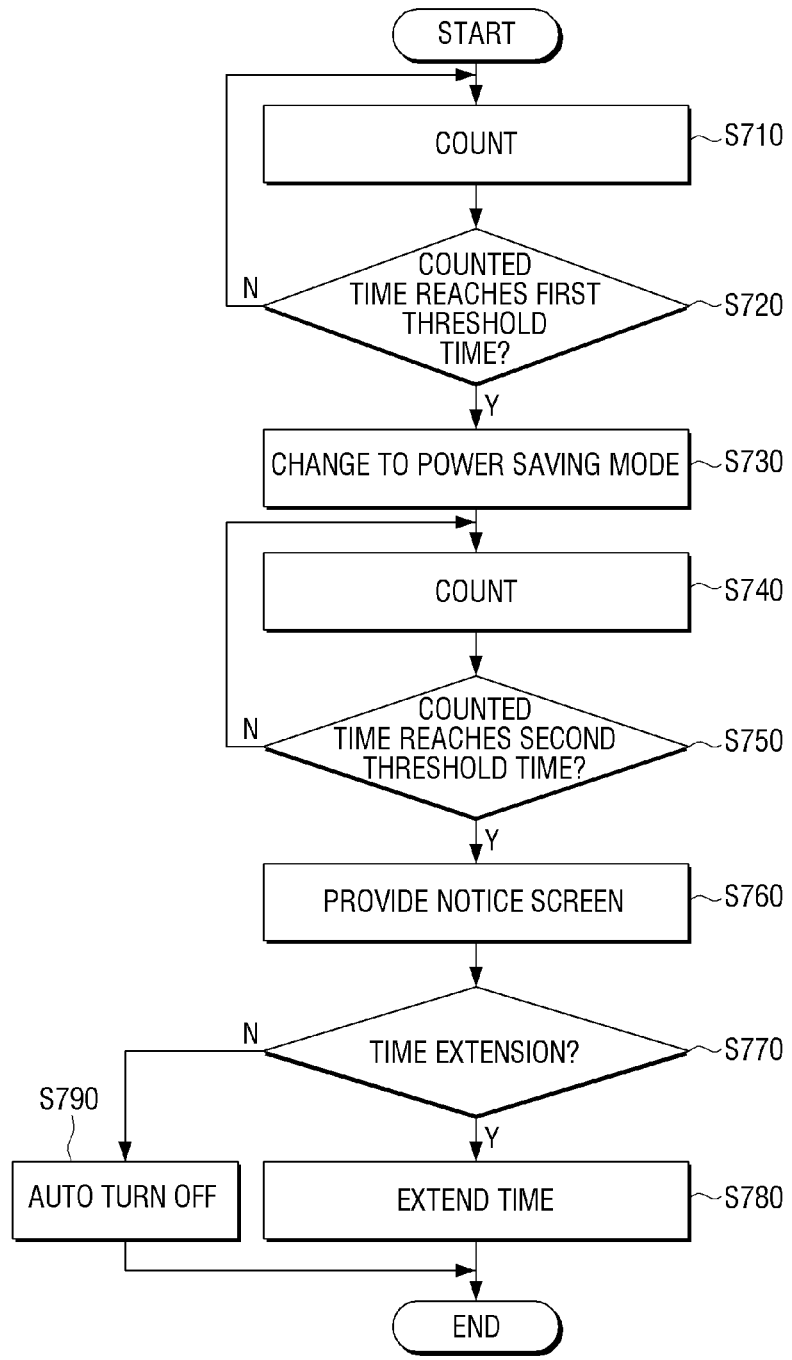
FIG. 7 is a flowchart illustrating a method of controlling power of an image forming apparatus according to an exemplary embodiment of the present general inventive concept.

FIG. 7 is a flowchart illustrating a method of controlling power of an image forming apparatus according to an exemplary embodiment of the present general inventive concept. Referring to FIGS. 1 through 7, when the image forming apparatus 100 is in an idle state in a general mode, the image forming apparatus 100 counts an elapsed time at operation S710. If the counted time reaches a first threshold time at operation S720, the image forming apparatus 100 changes the mode to a power saving mode at operation S730.

When the image forming apparatus is in the idle state in the power saving mode, the image forming apparatus 100 continues counting at operation S740 and determines whether the counted idle state time reaches a second threshold time or not at operation S750. When it is determined that the counted time reaches the second threshold time, a notice screen is provided at operation S760. According to various exemplary embodiments, the notice screen may be provided through the image forming apparatus 100 or the host apparatus 200.

When a request for time extension is input by the user after the notice screen is provided at operation S770, the image forming apparatus 100 extends a time at operation S780, and, when there is no request for time extension or if an auto power shut off menu is selected, the image forming apparatus 100 shuts off power at a predetermined time and is automatically turned off at operation S790.

Figure 8:
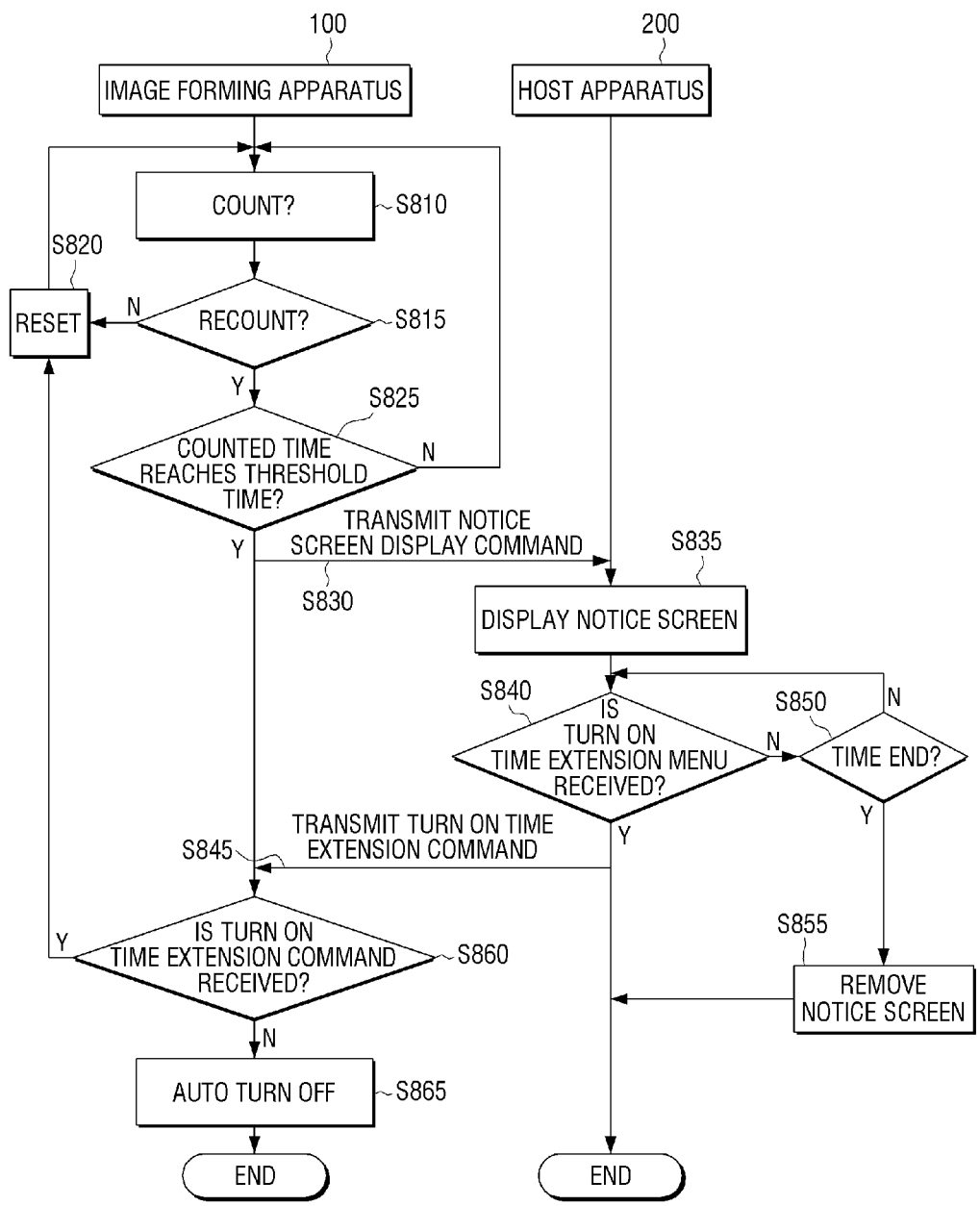
FIG. 8 is a timing chart illustrating a method of controlling power of an image forming system according to an exemplary embodiment of the present general inventive concept.

FIG. 8 is a timing chart illustrating a method of controlling power of an image forming system according to an exemplary embodiment of the present general inventive concept. Referring to FIGS. 1 through 8, the image forming apparatus 100 counts a time at operation S810 and determines whether a timer reset event occurs or not at operation S815. When the timer reset event occurs, the image forming apparatus 100 resets the timer unit at operation S820 and recounts a time at operation S810. It is frequently determined whether the timer reset event occurs or not. When it is determined that the counted time reaches a threshold time at operation S825, the image forming apparatus 100 transmits a notice screen display command to the host apparatus 200 at operation S830. In this case, the image forming apparatus 100 may determine whether there is an uncompleted job or there is a job to be done in a job queue prior to transmitting the notice screen display command. When there is such a job, the image forming apparatus 100 resets the timer unit and recounts a time.

The host apparatus 200 displays a notice screen according to the notice screen display command at operation S835. If a turn on time extension menu is selected on the notice screen at operation S840, the host apparatus 200 transmits a turn on time extension command to the image forming apparatus 100 at operation S845.

When the turn on time extension menu is not selected and the time elapses at operation S850, the host apparatus 200 removes the notice screen at operation S855.

When the turn on time extension command is received until a predetermined time elapses after the notice screen is displayed at operation S860, the image forming apparatus 100 resets the timer unit at operation S820 and recounts a time at operation S810. As a result, the turn on time is extended.

When the turn on time extension command is not received until the predetermined time elapses after the notice screen is displayed at operation S860, the image forming apparatus 100 is automatically turned off.

According to various exemplary embodiments described above, since the image forming apparatus 100 counts the idle state time and automatically shuts off the power, it can solve various problems which may occur due to auto shut off.

When a printing job is being prepared through a driver at a time when power is set to be automatically shut off, when a state of the image forming apparatus 100 is being checked or changed through a remote user interface (UI), when a job is on standby in a job queue, when a job in progress is not completed due to an error and is on standby, or when an external apparatus such as a wireless apparatus access the image forming apparatus 100, the image forming apparatus 100 automatically resets the timer unit and extends the turn on time.

Also, when the user requests a time extension on the notice screen, the image forming apparatus 100 may extend the turn on time. In this case, the image forming apparatus 100 may extend the turn on time by resetting the timer unit and recounting or by substituting a set threshold time with a newly extended threshold time. Accordingly, an auto power shut off operation is effectively performed.

Figure 9:
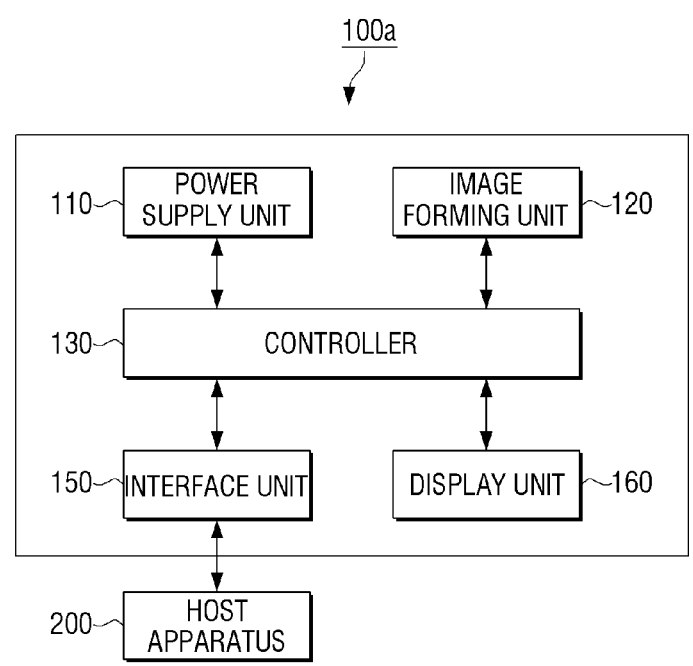
FIG. 9 is a block diagram illustrating an image forming apparatus according to an exemplary embodiment of the present general inventive concept.

FIG. 9 illustrates an image forming apparatus 100a according to an exemplary embodiment of the present general inventive concept. The image forming apparatus 100a may include a power supply unit 110, an image forming unit 120, a controller 130, an interface unit 150, and a display unit 160. The controller 130 controls the corresponding units. The power supply unit 110 and image forming unit 120 of FIG. 9 may be same as the power supply unit 110 and the image forming unit 120 of FIG. 1, respectively. The controller 130 of FIG. 9 may be a combination of the controller 130 and the timer unit 140 of FIG. 1. It is possible that the controller 130 of FIG. 9 does not have a structure of the timer unit 140 of FIG. 1 therein, and the controller 130 of FIG. 9 may have a program to perform the above-described method. The interface unit 150 communicates with the host apparatus 200 to receive data to form an image on a medium and also to communicate with the host apparatus 200 to transmit a signal for the notice screen and receive a user command to extend the power shut off time. The display unit (or display touch panel) 160 displays menus corresponding to operations of the image forming apparatus and the notice screen and receives a user command to extend the power shut off time.

The power turn on time corresponding to the power shut off time and the extended power turn on time corresponding to the extended power shut off time may not overlap. In this case, when a user selection to extend the power turn on time is received, the extended power turn on time controller 130 may start after the power turn on time expires. However, it is possible that the power turn on time corresponding to the power shut off time and the extended power turn on time corresponding to the extended power shut off time may overlap. In this case, the extended power turn on time restart when the user selection is received or before the power turn on time expires.

According to an exemplary embodiment of the present general inventive concept, an image forming apparatus may generate a signal corresponding to a notice screen to extend a first mode changing time to change a normal operation mode to a power saving mode and/or to extend a second mode changing time to change a power saving mode to a power shut off mode. It is possible that the image forming apparatus may not perform an operation of extending the first mode changing time but perform an operation of extending the second mode changing time.

It is also possible that the image forming apparatus may generate the notice screen during a period between a starting time and an automatic power shut time (turn on time). The turn on time is a time to maintain supply of power to the corresponding element of the image forming apparatus in a power saving mode, a normal mode, or an idling time mode. The automatic power shut off time is a time to terminate the supply of power to shut off the corresponding element or all elements of the image forming apparatus after the turn on time expires. When the turn on time is extended, the automatic power shut time may also be extended from an originally set power shut off time or a time when the mode is changed. That is, when one hour is set as the automatic power shut time to turn off one hour from the starting time or is set as the turn on time to maintain the supply of power in the corresponding mode, a first notice screen may be generated and displayed at forty minutes and a second notice screen may be generated and displayed at fifty minutes from the starting time during the period. When there is a user command to extend the automatic power shut time at the first notice screen, the image forming apparatus resets the period and restarts counting clocks according to a newly set period. In this case, the second notice screen is not generated and displayed. When there is no user command during the first notice screen, the second notice screen is generated and displayed. When a user command to extend the automatic power shut off time at the second notice screen, the image forming apparatus resets and restart counting clocks.

The first notice screen may be generated and displayed for a first time period, and the second notice screen may be generated and displayed for a second time period. The first time period and the second time period may be same, for example, five minutes. However, it is possible the first time period and the second time period may be different. The second time period may be ten minutes between the fifty minutes and sixty minutes. The second notice screen may be terminated on or before the second time period expires.

That is, the present general inventive concept can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), flash memory, CD-ROMs, an erasable programmable ROM (EPROM), an electronically erasable and programmable ROM (EEPROM), a register, a hard disk, a removable disk, a memory card, a USB memory, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   an image forming unit to perform an image forming job;
   a power supply unit to supply power to the image forming unit;
   a timer unit to count an idle state time of the image forming unit;
   an interface unit to communicate with a host apparatus; and
   a controller to provide a notice screen to the host apparatus and to receive a selection as to whether to extend a turn on time when the idle state time reaches a predetermined threshold time through the interface unit, to control the power supply unit to shut off power and to extend the turn on time of the idle state time according to user selections made on the notice screen of the host apparatus.

2. The image forming apparatus as claimed in claim 1, further comprising:
   the interface unit connected to the host apparatus,
   wherein, when the idle state time reaches the threshold time, the controller transmits a notice screen display command to the host apparatus so that the notice screen is displayed through the host apparatus, and, when a turn on time extension menu is selected on the notice screen, the controller controls the power supply unit to extend the turn on time.

3. The image forming apparatus as claimed in claim 2, wherein, when an auto power shut off menu is selected on the notice screen displayed on the host apparatus or when user selection is not made for a predetermined time, the controller controls the power supply unit to shut off the power automatically.

4. The image forming apparatus as claimed in claim 3, wherein, when the idle state time reaches the threshold time, the controller checks whether there is a job to be done in a job queue or there is an uncompleted job, and when there is one or more of the job to be done in the job queue and the uncompleted job waiting to be completed, the controller resets the timer unit.

5. The image forming apparatus as claimed in claim 3, wherein, the controller controls the timer unit to reset the idle state time based on a timer reset event.

6. The image forming apparatus as claimed in claim 1, further comprising:
   an interface unit connected to a host apparatus,
   wherein, when the idle state time reaches the threshold time, the controller provides the notice screen through the interface unit for display on a user interface of the host apparatus,
   wherein, when a turn on time extension menu is selected on the notice screen, the controller extends the turn on time, and, when an auto power shut off menu is selected on the notice screen or user selection is not made for a predetermined time, the controller controls the power supply unit to shut off the power automatically.

7. The image forming apparatus as claimed in claim 1, wherein:
   when an idle state time counted in a general mode of the image forming unit reaches a predetermined first threshold time, the controller changes the mode to a power saving mode; and
   when an idle state time counted from when the mode is changed to the power saving mode reaches a predetermined second threshold time, the controller provides the notice screen and controls the power supply unit to shut off the power automatically or extend the turn on time according to user selection made on the notice screen.

8. The image forming apparatus as claimed in claim 1, wherein the interface unit receives a second selection as to whether to immediately shut off power to the image forming apparatus according to a user selection made on the notice screen, and
   wherein the notice screen is displayable on a host apparatus.

* * * * *